US010481770B2

(12) United States Patent
Gutermuth et al.

(10) Patent No.: US 10,481,770 B2
(45) Date of Patent: Nov. 19, 2019

(54) SYSTEM AND METHOD FOR VISUALIZING TECHNICAL EQUIPMENT OF AN INDUSTRIAL PLANT

(71) Applicant: ABB TECHNOLOGY AG, Zürich (CH)

(72) Inventors: Georg Gutermuth, Heidelberg (DE); Pablo Rodriguez Carrion, Ilvesheim (DE)

(73) Assignee: ABB Schweiz AG, Baden (CH)

( * ) Notice: Subject to any disclaimer, the term of this patent is extended or adjusted under 35 U.S.C. 154(b) by 297 days.

(21) Appl. No.: 14/479,935

(22) Filed: Sep. 8, 2014

(65) Prior Publication Data
US 2014/0380177 A1 Dec. 25, 2014

Related U.S. Application Data

(63) Continuation of application No. PCT/EP2012/054033, filed on Mar. 8, 2012.

(51) Int. Cl.
*G06F 3/0484* (2013.01)
*G06F 16/90* (2019.01)
(Continued)

(52) U.S. Cl.
CPC .......... *G06F 3/0484* (2013.01); *G06F 3/0482* (2013.01); *G06F 16/90* (2019.01); *H04L 41/22* (2013.01)

(58) Field of Classification Search
CPC .......... G05B 19/0423; G06F 17/30943; G06F 3/0482; G06F 3/0484; H04L 41/22
See application file for complete search history.

(56) References Cited

U.S. PATENT DOCUMENTS 5,768,552 A * 6/1998 Jacoby ................ G06T 11/206
345/418
6,480,889 B1 * 11/2002 Saito ................ H04L 29/12113
709/220
(Continued)

FOREIGN PATENT DOCUMENTS

CN 1734381 A 2/2006
CN 102006193 A 4/2011
(Continued)

OTHER PUBLICATIONS

International Search Report (PCT/ISA/210) dated Dec. 12, 2012, by the European Patent Office as the International Searching Authority for International Application No. PCT/EP2012/054033.
(Continued)

Primary Examiner — Andrea N Long
(74) Attorney, Agent, or Firm — Barnes & Thornburg LLP

(57) ABSTRACT

An exemplary system and method for displaying technical equipment of an industrial plant includes a graphical display unit and a user interface for receiving image handling parameters. A data storing unit provides data relating to the technical equipment in the form of device data and network data describing a communication network of the industrial plant. The device data describes network devices which are all connected to the communication network and belong to the industrial plant, and the network data describes all the communication connections between the network devices. A data processing unit is arranged for retrieving the provided data, transforming all the device data and all the network data into displayable information, and providing the image representations together with other displayable information to the graphical display unit. The graphical display unit is arranged to display the image representations and other
(Continued)

displayable information according to the image handling parameters.

18 Claims, 11 Drawing Sheets

(51) Int. Cl.
  *G06F 3/0482* (2013.01)
  *H04L 12/24* (2006.01)

(56) References Cited

U.S. PATENT DOCUMENTS

| | | | |
|---|---|---|---|
| 6,728,262 B1 | 4/2004 | Woram | |
| 7,194,446 B1* | 3/2007 | Bromley | G05B 19/0423 706/12 |
| 7,315,985 B1 | 1/2008 | Gauvin et al. | |
| 2003/0088683 A1 | 5/2003 | Kitamura et al. | |
| 2004/0049577 A1* | 3/2004 | Imhof | H04L 12/2602 709/224 |
| 2004/0085347 A1* | 5/2004 | Hagarty, Jr. | H04L 41/12 715/735 |
| 2005/0228517 A1 | 10/2005 | Tomita | |
| 2006/0282529 A1* | 12/2006 | Nordin | H04L 43/0811 709/224 |
| 2007/0038321 A1* | 2/2007 | McDonald | G05B 17/02 700/96 |
| 2007/0067142 A1* | 3/2007 | Kavaklioglu | G06F 11/008 702/182 |
| 2007/0239291 A1* | 10/2007 | Wayland | G05B 23/0272 700/83 |
| 2009/0182501 A1* | 7/2009 | Fyke | G01C 21/20 701/431 |
| 2009/0327903 A1* | 12/2009 | Smith | H04L 41/12 715/737 |
| 2010/0016994 A1 | 1/2010 | Hansen et al. | |
| 2010/0017746 A1* | 1/2010 | Husoy | G06F 9/4443 715/781 |
| 2010/0205535 A1 | 8/2010 | Mitamura et al. | |
| 2011/0115816 A1* | 5/2011 | Brackney | G06Q 10/06 345/629 |
| 2012/0089713 A1* | 4/2012 | Carriere | H04L 12/4641 709/222 |
| 2012/0290107 A1* | 11/2012 | Carlson | G05B 19/058 700/83 |
| 2013/0080903 A1* | 3/2013 | Barda | H04L 63/0236 715/736 |
| 2013/0185024 A1* | 7/2013 | Mahasenan | H04W 16/18 703/1 |
| 2013/0222373 A1* | 8/2013 | Weinstein | G06Q 50/16 345/419 |
| 2014/0025339 A1* | 1/2014 | McAdam | G05B 19/0425 702/188 |

FOREIGN PATENT DOCUMENTS

| | | |
|---|---|---|
| EP | 1 586 966 A2 | 10/2005 |
| JP | S63100575 A | 5/1988 |
| JP | 2001024652 A | 1/2001 |
| JP | 2001282323 A | 10/2001 |
| JP | 2005327263 A | 11/2005 |
| JP | 2007536647 A | 12/2007 |
| JP | 2008004087 A | 1/2008 |
| JP | 2008310688 A | 12/2008 |
| JP | 2009048650 A | 3/2009 |
| JP | 2010211378 A | 9/2010 |
| WO | WO 2008/087191 A1 | 7/2008 |
| WO | 2008/146380 A1 | 12/2008 |
| WO | 2011/151768 A1 | 12/2011 |

OTHER PUBLICATIONS

Brochure entitled "System 800xA for Power Generation: Integrated automation for the power industry", by ABB Ltd, 2009, Document ID—9AKK104295D3513 (24 pages).

MXview User's Guide Third Edition, Jan. 2012; downloaded from www.moxa.com/product; 72 pages.

* cited by examiner

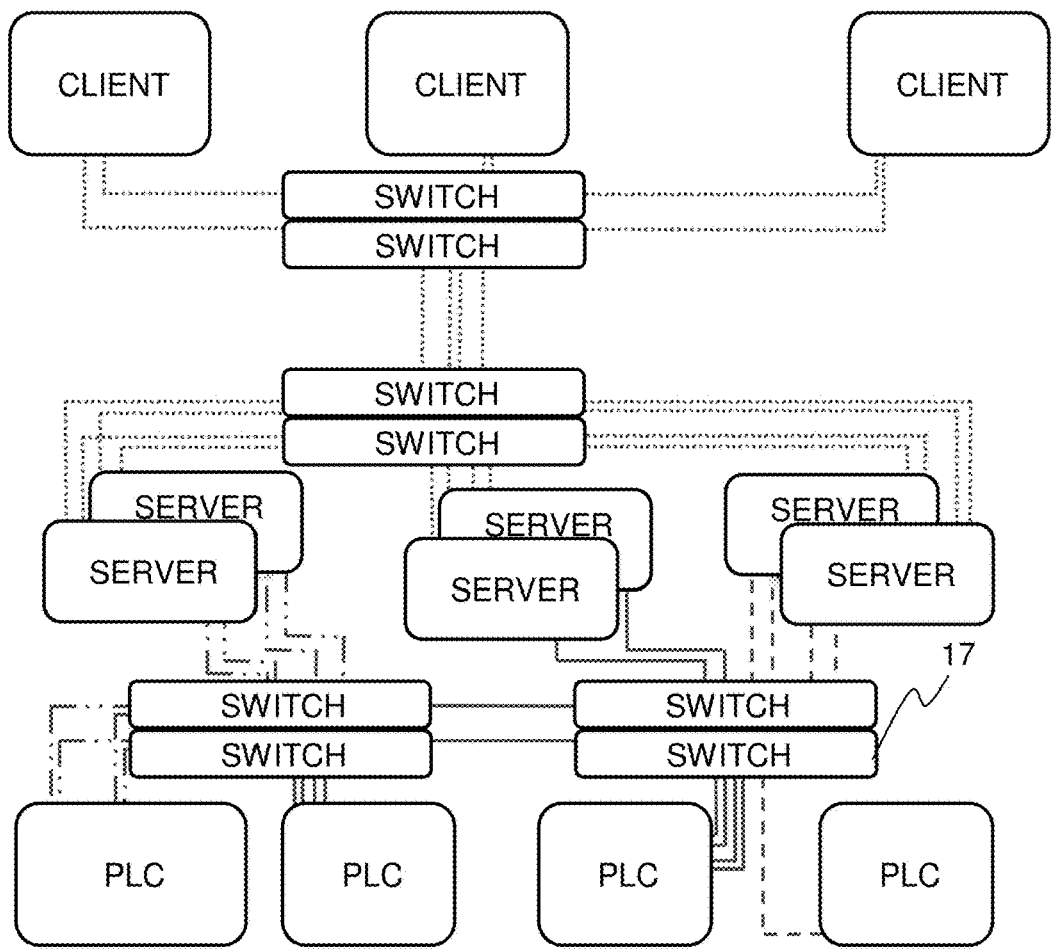
Fig. 4
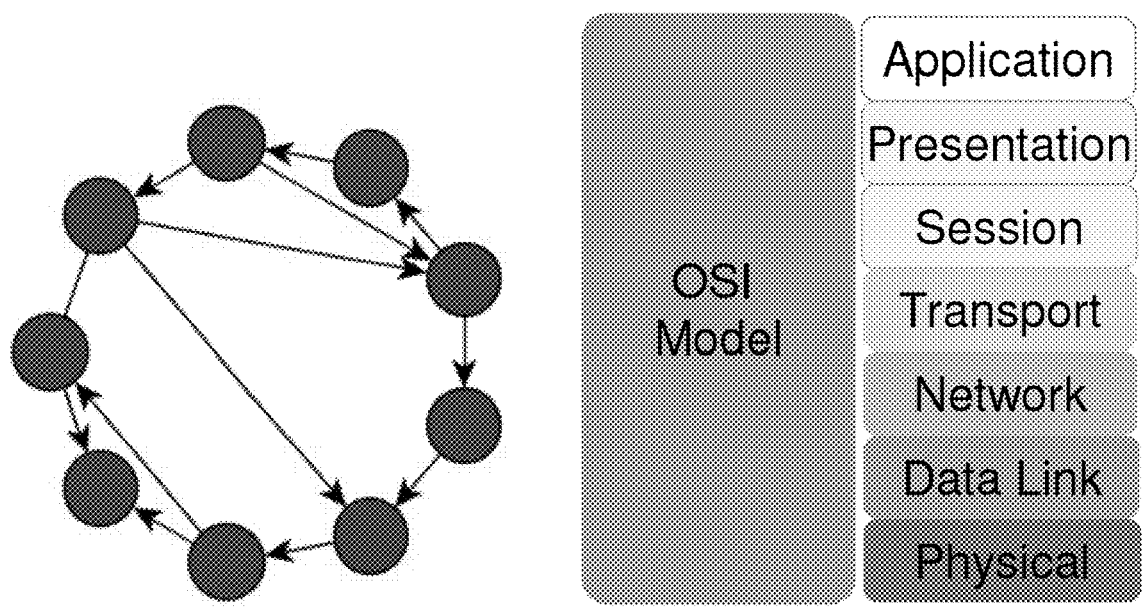
Fig. 9
Fig. 13

SYSTEM AND METHOD FOR VISUALIZING TECHNICAL EQUIPMENT OF AN INDUSTRIAL PLANT

RELATED APPLICATION(S)

This application claims priority as a continuation application under 35 U.S.C. § 120 to PCT/EP2012/054033 filed as an International Application on Mar. 8, 2012 designating the U.S., the entire content of which is hereby incorporated by reference.

FIELD

The present disclosure relates to a system and method for visualizing technical equipment of an industrial plant. The system can include a user interface arranged for receiving image handling parameters, a graphical display unit arranged for visualizing displayable information in at least one graphical image taking into account the image handling parameters, a data storing unit arranged for providing data relating to the technical equipment and a data processing unit arranged for retrieving the stored data, for transforming them into the displayable information and for providing the displayable information to the graphical display for visualization.

BACKGROUND INFORMATION

With the term "industrial plant", any large-scale industrial installation is meant which can for example belong to one of the industrial fields of power generation and transmission, water desalination and distribution, manufacturing of industrial and consumer products or processing of metals, pulp and paper, minerals or oil and gas. In the following, simply the term "plant" is used to cover all of these installations.

During the whole life cycle of such a plant, different types of computer-implemented tools are used which individually support the related personnel in connection with different stages of the life of the plant, such as planning, installation, implementation, configuration, operation, maintenance or servicing of the technical equipment in the plant. Further, separate tools can be required when dealing with different technical aspects of the plant, for example a distributed control system versus an electrical power supply installation versus a monitoring and surveillance system.

Each of the different tools can provide a graphical user interface (GUI) which allows for the visualization of the technical equipment of the plant. The GUIs commonly provide functionality to design or configure or monitor, respectively, the technical equipment, depending on the specific purpose of the tool.

During the last few years, a trend towards an integration of these tools behind one and the same GUI can be observed, as is for example described in the brochure "System 800xA for Power Generation: Integrated automation for the power industry", by ABB Ltd, 2009, Document ID—9AKK104295D3513, which is available online.

The current focus of this trend towards tool integration, which is reflected in this brochure, lies on the functional aspects, e.g., to generate synergy effects with respect to faster project execution, easier handling of plant data and reduction of costs.

With respect to the visualization of the data generated, modified and used by the integrated tools, it is mentioned in the brochure that a single window environment is used to represent different kinds of data. However, from the brochure it becomes clear that still each tool gets its own visual representation in the single window, which means that for the above named different stages and technical aspects related to each tool, different parts of the technical equipment of the plant become visible.

SUMMARY

An exemplary system for displaying a communication network interconnecting technical equipment of an industrial plant is disclosed, comprising: a user interface arranged for receiving image handling parameters: a graphical display unit arranged for displaying displayable information in at least one graphical image taking into account the image handling parameters; a data storing unit arranged for providing data relating to the technical equipment; and a data processing unit arranged for retrieving the provided data, for transforming them into the displayable information and for providing the displayable information to the graphical display for display, wherein the data storing unit is arranged to provide the data relating to the technical equipment as device data and network data describing a communication network of the industrial plant, wherein the device data describes network devices which are all connected to the communication network and belong to the industrial plant, wherein the network data describes all the communication connections between the network devices, wherein the data processing unit is arranged to transform all the device data and all the network data into displayable information which contains image representations of all of the network devices and of all of the communication connections generate a plant view containing the image representations in such a way that the following becomes visible: geographical locations of the network devices inside the plant and physical connection lines, implemented logical connections, or available communication paths between the network devices, and wherein the graphical display unit is arranged to display the image representations and further displayable information according to the image handling parameters.

An exemplary method for displaying technical equipment of an industrial plant is disclosed, comprising: receiving image handling parameters; displaying displayable information in at least one graphical image taking into account the image handling parameters; providing data relating to the technical equipment; retrieving stored data for transforming the data into the displayable information and for providing the displayable information to the graphical display for display; providing the data relating to the technical equipment in the form of device data and network data describing a communication network of the industrial plant, wherein the device data describes network devices which are all connected to the communication network and belong to the industrial plant, and the network data describe all the communication connections between the network devices; transforming all the device data and all the network data into displayable information which contains image representations of all of the network devices and of all of the communication connections; generating a plant view containing the image representations in such a way that the following becomes visible: geographical locations of the network devices inside the plant and physical connection lines, implemented logical connections, or available communication paths between the network devices; and displaying the image representations and further displayable information according to the image handling parameters.

BRIEF DESCRIPTION OF THE DRAWINGS

The disclosure and its further embodiments will become apparent from the examples described below in connection with the appended drawings which illustrate:

FIG. 4 shows a physical view of the network of FIG. 3 according to an exemplary embodiment of the present disclosure;

FIG. 9 shows the arrangement of image representations in a circular way according to an exemplary embodiment of the present disclosure;

FIG. 13 shows the OSI model of computer networking according to an exemplary embodiment of the present disclosure;

DETAILED DESCRIPTION

Figure 1:
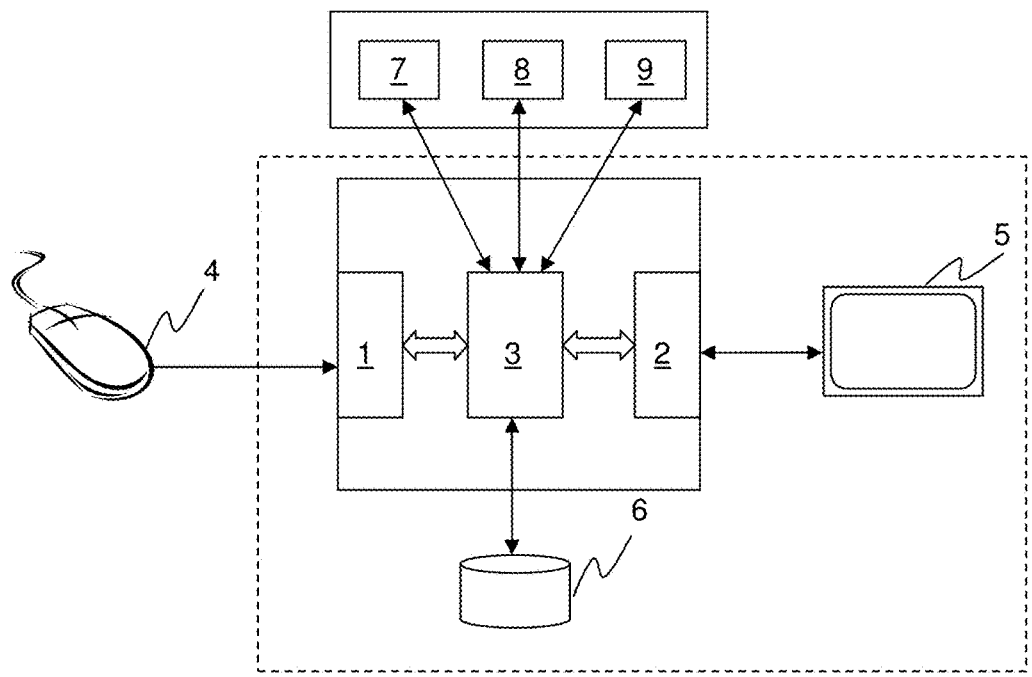
FIG. 1 shows a system for visualizing technical equipment of an industrial plant or industrial system according to an exemplary embodiment of the present disclosure.

Exemplary embodiments of the present disclosure provide a system and method for visualizing the technical equipment of an industrial plant to be used during the different stages and with respect to the different technical aspects explained above.

In an exemplary system according to the present disclosure, the data storing unit provides the data relating to the technical equipment in the form of device data and network data describing the communication network of the industrial plant, where the device data describes each and every network device which is connected to the communication network and belongs to the industrial plant, and where the network data describes each and every communication connection between the network devices. Further, the data processing unit transforms the device data and network data into displayable information which contains image representations of each and every network device and each and every of the communication connection, and the graphical display unit visualizes (e.g., displays) the image representations and all further (e.g., additional, other) displayable information.

Accordingly, an exemplary system of the disclosure can be based on two general ideas: first, to graphically represent the technical equipment of the plant not from a functional perspective, but instead from a perspective of network communication, and second, to include not only those network devices and their related communication connections which traditionally belong to one of the above named stages or technical aspects of the plant, but to make the whole communication network of the plant available for visualization in one and the same graphical image.

an exemplary method according to the present disclosure can include all the functional steps performed by the elements of the above described system.

It should be understood almost all of the technical equipment installed in a plant is connected to at least one data communication bus, where the different data communication busses of one and the same plant are connected with each other and form a global communication network of the plant. In today's GUIs, only selected parts of the technical equipment are visualized at once, where the selection of these parts is performed according to their functional interrelations. For example, a distributed control system (DCS) of the plant is visualized separately from an automation system of a power supply network installed in the same plant. For the DCS, pictograms of industrial controller devices can be shown connected to pictograms of the machines, actuators and/or production facilities which they control, whereas the automation system of the power supply network can be depicted in a separate image based on a so called single-line diagram. As a result, a user who mainly wants to see information of the DCS, but who also needs to get additional information from the automation system, has to switch between different views or windows.

According to exemplary embodiments of the present disclosure, this functional separation during visualization of the plant can be overcome by considering the whole plant from the point of view of network communication and by no longer distinguishing between the technical or functional aspects of the nodes of the network, e.g., of the devices which are connected to the plant network. The term "network devices" in this context means literally all devices which in any way are connected to the communication network, where the communication network of the plant can be a network consisting of different network types interconnected with each other. As a result of the exemplary embodiments disclosed herein, the whole topology of the plant communication network becomes visible in one graphical view. This graphical view can become the starting point for all activities to be performed with the above described integrated system which combines the different computer-implemented tools for planning, installation and operation of the plant behind one and the same GUI. From this starting point, a user can navigate to the specific parts and devices of the plant which are of current interest to him. At the same time, he can move back upwards for getting more general overview information which can help him to better understand the broader context of what is currently being done. The switching between different tools, windows and formats is thereby overcome.

In an exemplary embodiment of the disclosure, the user interface is arranged for receiving plant related input data, the data storing unit is arranged for updating the device data and network data in accordance with the plant related input data or in accordance with update information received from an external data source, the data processing unit is arranged to automatically update the image representations as soon as the device data and network data are updated, and the graphical display unit is arranged to automatically update the visualization of the image representations and further displayable information as soon as the image representations are updated.

The exemplary embodiments described herein provides a main advantage over known systems. Currently, when a graphical overview over the whole of the technical equipment belonging to an industrial plant is specified, it is common practice to draw such an overview by hand, using for example graphical software tools as Visio. This means that changes in the technical equipment, for example in the number or type of devices or in their arrangement or interconnections result in a considerable effort to amend the drawing accordingly. Further, whenever a different view of the overview was requested, this different view had to be created by hand as well. Through the exemplary embodiments of the present disclosure, this effort is now completely avoided since any changes in the technical equipment as well as in the desired way of representation are reflected automatically in the graphical overview of the network shown on the screen. In the system, changes can be caused either by a user who, for example, re-configures network devices or their communication connections, who deletes or adds network devices in a planned installation provided by the data storing unit or who requests a different way of graphical network representation via a change in the image handling parameters. Or, the changes in the data storing unit can be caused by an external data source, where the external changes are then reflected in the data provided by the data storing unit 6. External changes can for example originate from at least one computer-implemented engineering tool or from a system for monitoring and surveillance of the status of the technical equipment.

In a further embodiment of the disclosure, the communication network of the plant is divided into part-networks where at least two of the part-networks are implemented with differing physical layers and/or with differing network communication protocols and/or where the boundary of at least one of the part-networks is defined by corresponding image handling parameters. Since according to the disclosure, the whole communication network of the plant is visualized in one and the same screen, the term part-network is introduced to allow for a differentiation of the elements of the network with respect to different attributes.

The attribute of differing physical layers makes reference to the OSI model of computer networking. FIG. 13 shows the OSI model of computer networking according to an exemplary embodiment of the present disclosure. The physical layer is the lowermost layer of the seven layers of the OSI model, and it describes the hardware and basic transmission related aspects of the respective network connection. Examples for part-networks which are defined by their physical layer are an Industrial Ethernet part-network, a RS-485 serial communication part-network used for field bus communication and an analogue 4-20 mA current loop.

Known examples for network communication protocols which can be used to distinguish part-networks from each other are HART, Profibus, Modbus, Profinet, Foundation Fieldbus, EtherCAT, IEC61850 and Ethernet, for example Industrial Ethernet.

Apart from these OSI related differentiations, a part-network in the graphically displayed communication network of the plant can also be defined by selecting it via the user interface. In this sense, the part-network can be defined by graphical boundaries which are input to the system in the form of so called image handling parameters.

According to a exemplary embodiment of the system, a first of the part-networks can include as network devices plant controller devices of a distributed control system and/or a second of the part-networks can include as network devices automation devices of a power supply system and/or a third of the part-networks can include as network devices operation servers and/or operation clients for monitoring plant controller devices and/or automation devices.

Known plant controller devices of the first of the part-networks can be the various DCS controllers available on the market, such as AC700F or AC800M by ABB, as well as programmable logic controllers (PLCs). Other network devices which can belong to the first of the part-networks are actuators and industrial sensors or instruments. The automation devices of the power supply system belonging to the second of the part-networks are also known under the term Intelligent Electronic Devices (IEDs). The third of the part-networks can cover the whole operations part of the communication network, e.g., not only the operation servers and clients themselves, but all other devices available for example in the central control room of the plant and connected via a network connection to the operation servers and/or clients, such as printers and terminals.

Each of the part-networks contains of course further network devices, where the further network devices fulfill functions directly related to the network communication itself, such as switches, routers, firewalls, gateways and industrial defenders.

FIG. 1 shows a system for visualizing technical equipment of an industrial plant or industrial system according to an exemplary embodiment of the present disclosure. As shown in FIG. 1, the system can include a user interface 1, which is connected to a user input device 4. The user input device 4 can be a mouse and/or a keyboard and/or a headset. The user interface 1 is arranged for receiving image handling parameters, which are input to the system via the user interface 4 by a user. Image handling parameters are parameters which define in which way the displayable information is visualized on the screen. Image handling parameters can be for example a desired zoom level or level of information density or a specific type of additional information etc. In the following, image handling parameters will be explained in connection with the other figures.

The system of FIG. 1 can include further a graphical display unit 5 arranged for visualizing displayable information in at least one graphical image taking into account the image handling parameters, a data storing unit 6 arranged for providing data relating to the technical equipment of the industrial plant and a data processing unit 3 arranged for retrieving the provided data, for transforming them into the displayable information and for providing the displayable information to the graphical display 5 via a graphics interface 2 for visualization.

The data storing unit 6 can be any kind of unit which is arranged for keeping data ready for further processing, e.g., it can contain a volatile and/or a non-volatile data memory, According to an exemplary embodiment of the disclosure, the data storing unit 6 can be arranged to provide the data relating to the technical equipment in the form of device data which describe network devices all connected to a communication network of the plant and belong to the plant, and network data which describe all the communication connections between the network devices. The data processing unit 3 is arranged to transform all the device data and all the network data into displayable information which contains image representations of all of the network devices and of all of the communication connections, and the graphical display unit 5 is arranged to display the image representations and further displayable information, such as text indicating the type of the displayed network device or network connection.

Computer implemented engineering and/or operations tools 7, 8 and 9 are connected to the data processing unit 3 and are arranged to be executed by the system of FIG. 1. The engineering and/or operations tools 7 to 9 can be for example a first tool for designing a DCS, a second tool for programming IEDs and a third tool for monitoring and controlling the operation of a production line.

Figure 2:
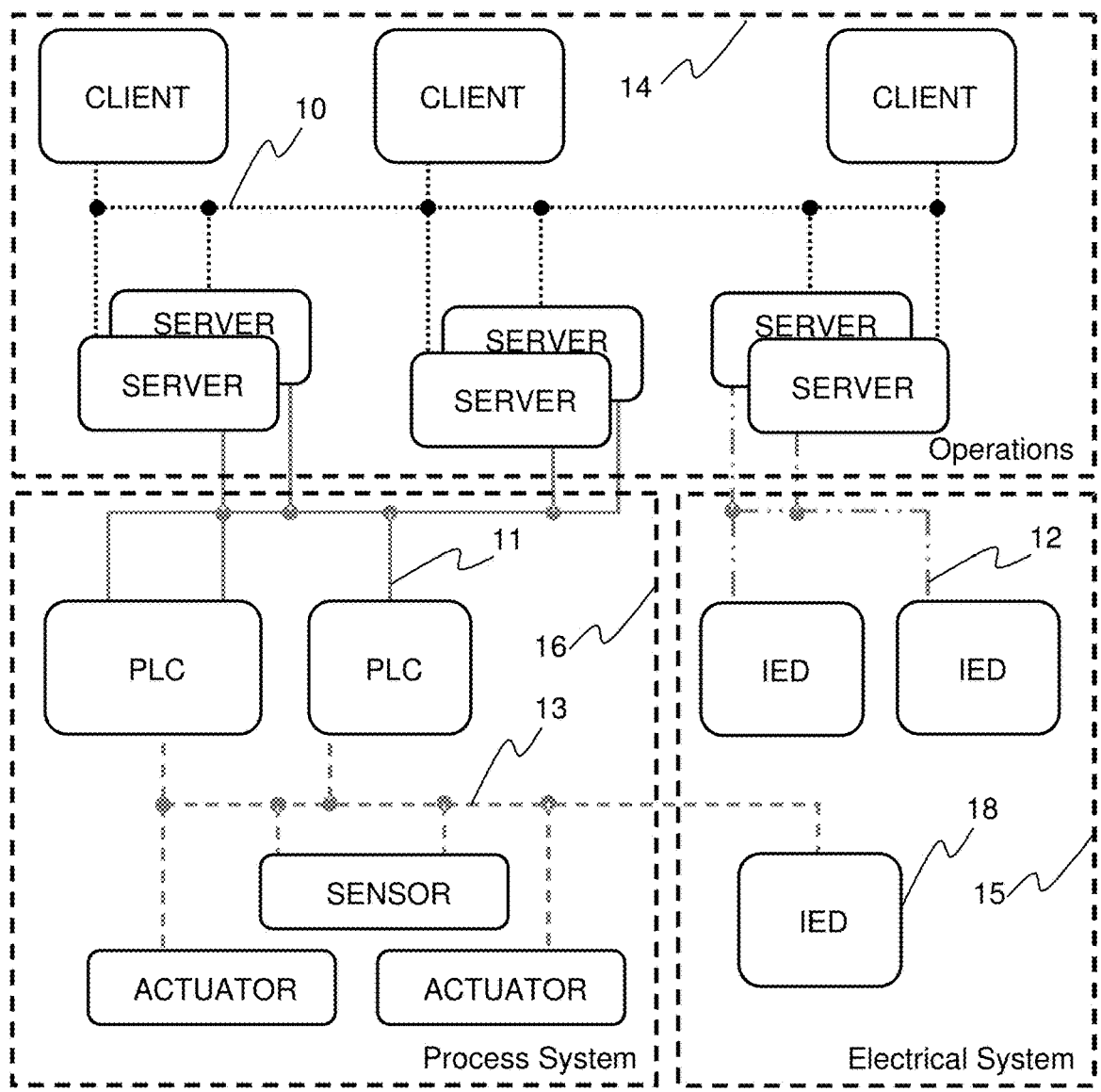
FIG. 2 shows a system topology view of the communication network of a plant according to an exemplary embodiment of the present disclosure.

FIG. 2 shows a system topology view of the communication network of a plant according to an exemplary embodiment of the present disclosure. FIG. 2 illustrates an example of a graphical image as it can be displayed by the graphical display unit 5. The graphical image contains a system topology view of the communication network of a plant, where the communication network can include as network devices three operation clients, six operation servers, two plant controller devices in the form of PLCs, one sensor, two actuators and three automation devices of a power supply system in the form of IEDs. The image representations of the network devices are in this example rounded rectangles, see for example IED 18. Any other graphical representations can of course be used, such as individual icons for each device type or small bitmaps of photographs of the devices.

The image representations of the communication connections 10 to 13 between the network devices of FIG. 2 can be straight lines with different line styles, where the line style is used to visualize different communication hardware and/or network protocols. In addition, three part-networks are made visible by surrounding them each with a dashed-line and by including text information about the type of the part-network. Accordingly, it can be seen from the system topology view that a first part-network 16 can include the PLCs, the actuators and the sensor as well as parts of a field bus 13 and parts of a controller communication bus 11. This first part-network 16 represents the process system of the plant. A second part-network 15 can include the IED as well as a small part of the field bus 13 and a part of the power communication bus 12. The second part-network 15 represents the automation system of the power supply system of the plant. A third part-network 14 represents the technical equipment needed for the operations aspects of the plant and can include the operations servers and operations clients as well as an office communication bus 10 and respective parts of the controller communication bus 11 and the power communication bus 12.

The system topology view of FIG. 2 gives a user a total overview of the complete network topology, as opposed to commonly known Ethernet network or DCS tools. Such visualization can be used as entry point for different groups of users, where each group has a specific role and task with respect to the stages and technical aspects of the plant and where each role calls for a different kind of knowledge.

Since these different user groups can prefer different ways of how the network topology is actually presented, the following figures are examples for embodiments of the disclosure, suggesting different types of views which can be adjusted to the particular needs of a user by corresponding image handling parameters.

Figure 3:
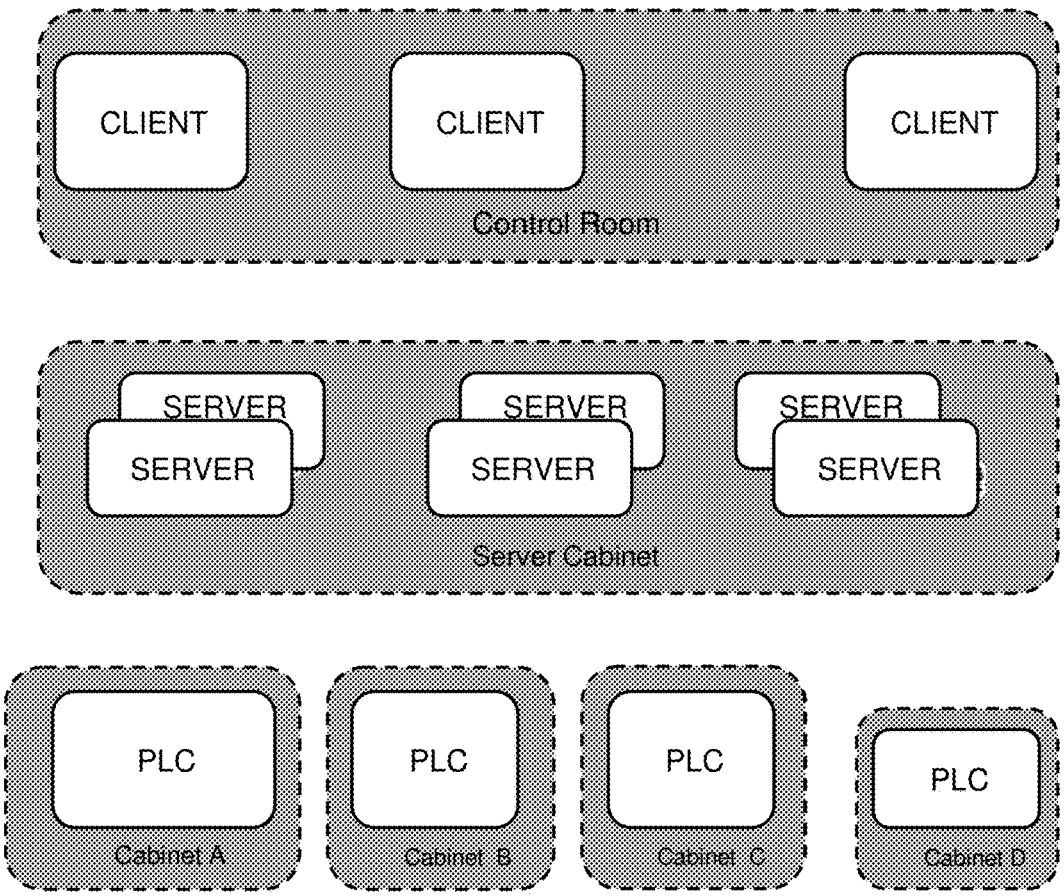
FIG. 3 shows a location view of the communication network of a plant according to an exemplary embodiment of the present disclosure.

FIG. 3 shows a location view of the communication network of a plant according to an exemplary embodiment of the present disclosure. FIG. 3 illustrates an example of a location view of a communication network of a plant, where each of the displayed network devices is visible in relation to its geographical location inside the plant. In the example, the network devices of the control room are shown separated from the network devices of a server cabinet, and both are located separated from the network devices of cabinets A to D located in the field, e.g., located close to the actuators of the plant. With geographical location it is mostly meant that the building, cable tray or floor where the network devices are situated is identified in the view. The image handling parameters for this example configure the graphical image of FIG. 3 to not visualize the network connections and the network device with sole network functionality. In other words, the image representations of the network connections and the of the network devices with sole network functionality, which are provided by the data processing unit 3, are suppressed on the way to the screen of the graphical display unit 5.

FIG. 4 shows a physical view of the network of FIG. 3 according to an exemplary embodiment of the present disclosure. In the physical view, the physical connection lines between the network devices are visualized, meaning the cabling. As can be seen, the communication connections are implemented redundantly, which is also true for some of the network devices, which are here the servers and the network switches. By using the physical view, a user can verify the status of implementation of network redundancy protocols in the plant, as for example RSTP (Rapid Spanning Tree Protocol), PRP (Parallel Redundancy Protocol) and MRP (Media Redundancy Protocol). In addition to the information shown here, the visualization can be made more sophisticated in the sense that the image representations of the network devices clearly show to which data port the cables are connected and that text information is included for example about network protocols and IP-addresses.

Figure 5:
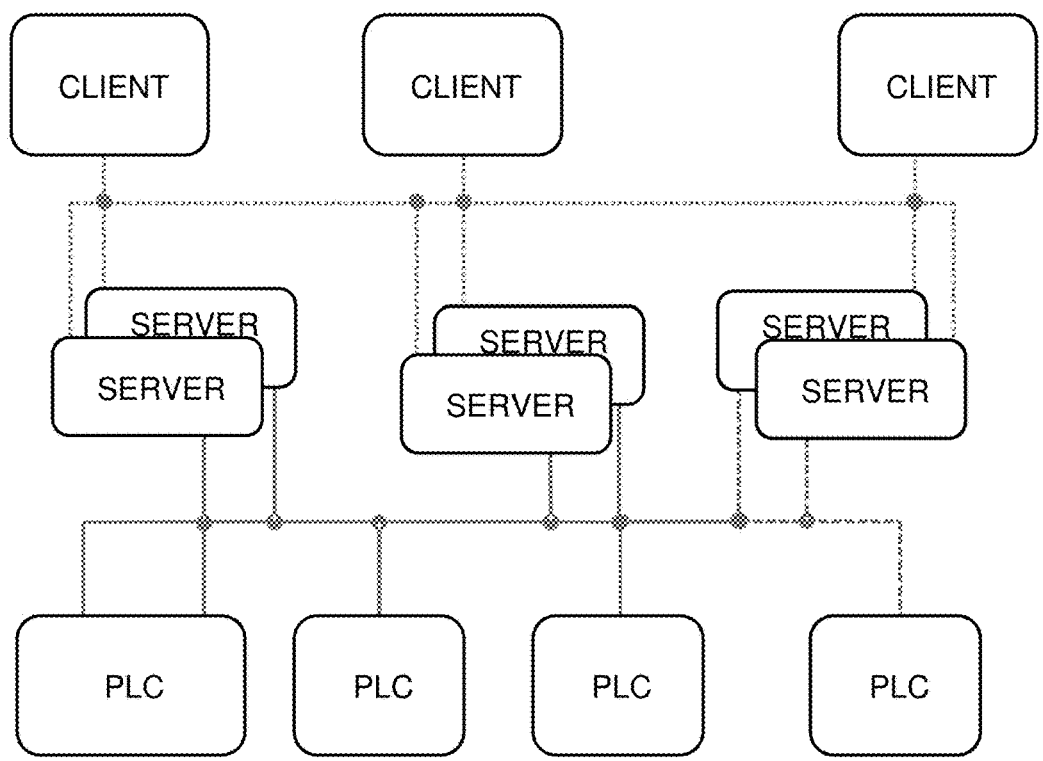
FIG. 5 shows a simplified view of the network of FIG. 3 according to an exemplary embodiment of the present disclosure.

FIG. 5 shows a simplified view of the network of FIG. 3 according to an exemplary embodiment of the present disclosure. As shown in FIG. 5, a simplified view of the communication network of FIGS. 3 and 4 illustrates which communication paths are generally available between the network devices, e.g., which network devices can theoretically communicate with each other due to an available communication link between them.

Figure 6:
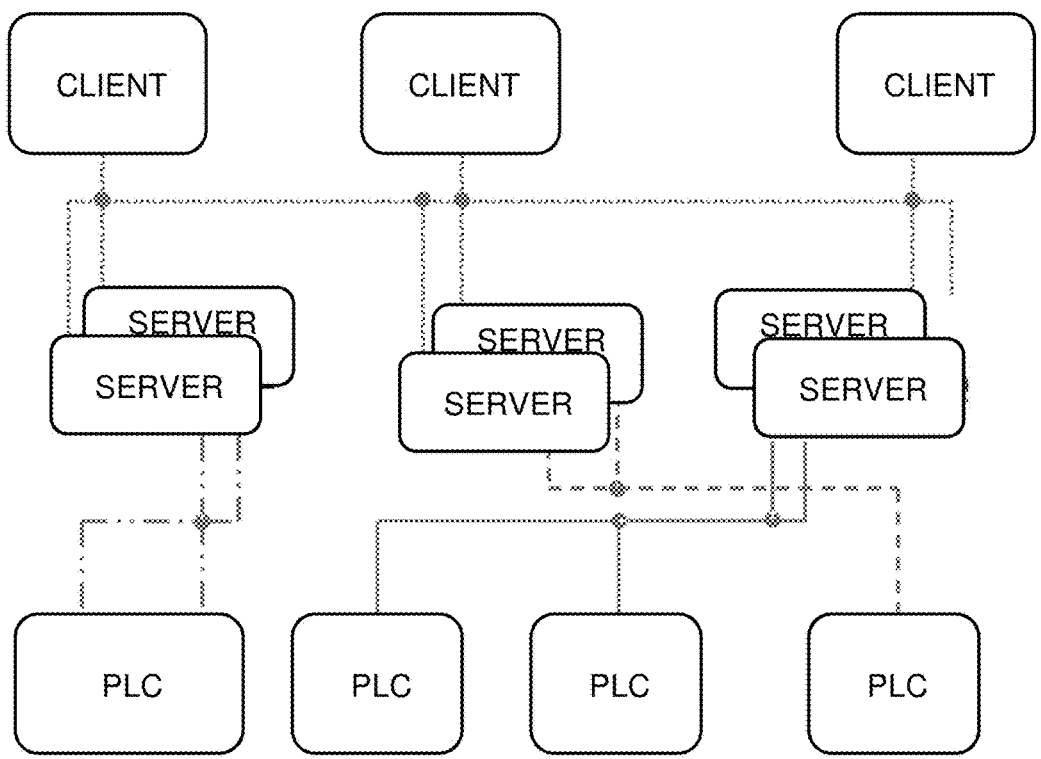
FIG. 6 shows a logical view of the network of FIG. 3 according to an exemplary embodiment of the present disclosure.

FIG. 6 shows a logical view of the network of FIG. 3 according to an exemplary embodiment of the present disclosure. FIG. 6 contrasts FIG. 5 in that the logical view as shown in FIG. 6 visualizes the logical connections as currently implemented between the network devices. When comparing FIG. 5 and FIG. 6 it becomes clear, that not all of the servers exchange information with all of the PLCs and that not all of the PLCs communicate with each other, even though they could be arranged to do that since they are all connected to a common communication bus. In other words, the logical view represents the peer to peer connections between network devices.

Figure 7:
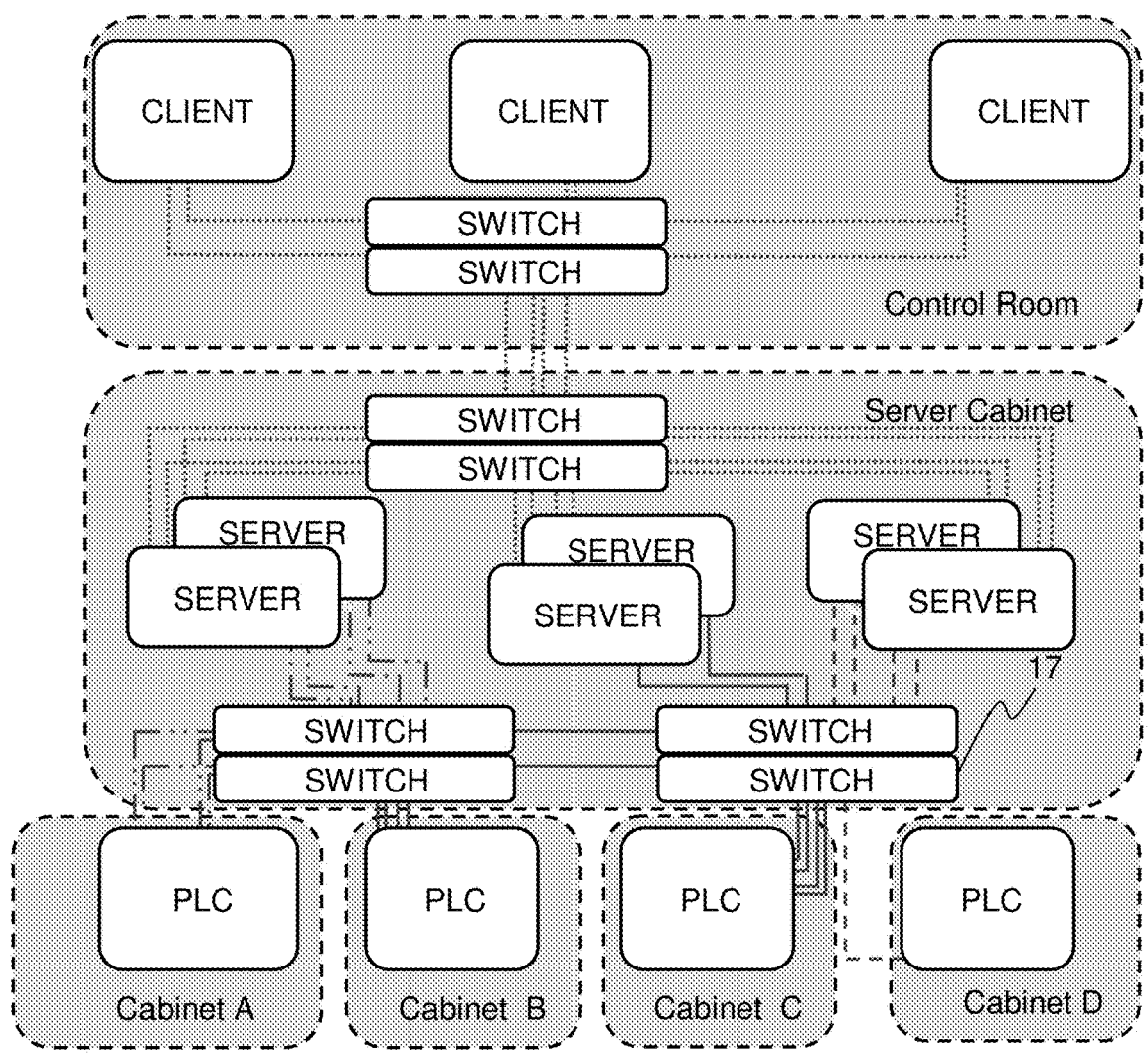
FIG. 7 shows a plant view of the network of FIG. 3 according to an exemplary embodiment of the present disclosure.

FIG. 7 shows a plant view of the network of FIG. 3 according to an exemplary embodiment of the present disclosure. As shown in FIG. 7, the plant view is depicted as a combination of a location view with at least one of the other views described above. In a plant view, both the geographical locations of the network devices inside the plant and one of the following are visible: the physical connection lines or the implemented logical connections or the available communication paths between the network devices, respectively. Accordingly, both the geographical and the network topology information are included in one and the same graphical image.

Starting from such a plant view, a completely new concept for visualization is suggested for the field of automation of an industrial plant, where the following can be shown in the same screen and at the same time the system topology of the automation system, the physical details of the plant, and process information or process values.

This particular combination of visual information is not currently used by automation control tools and it provides the advantage of making available simultaneously the above named graphical information without requiring any switching between different windows or tools.

Figure 17:
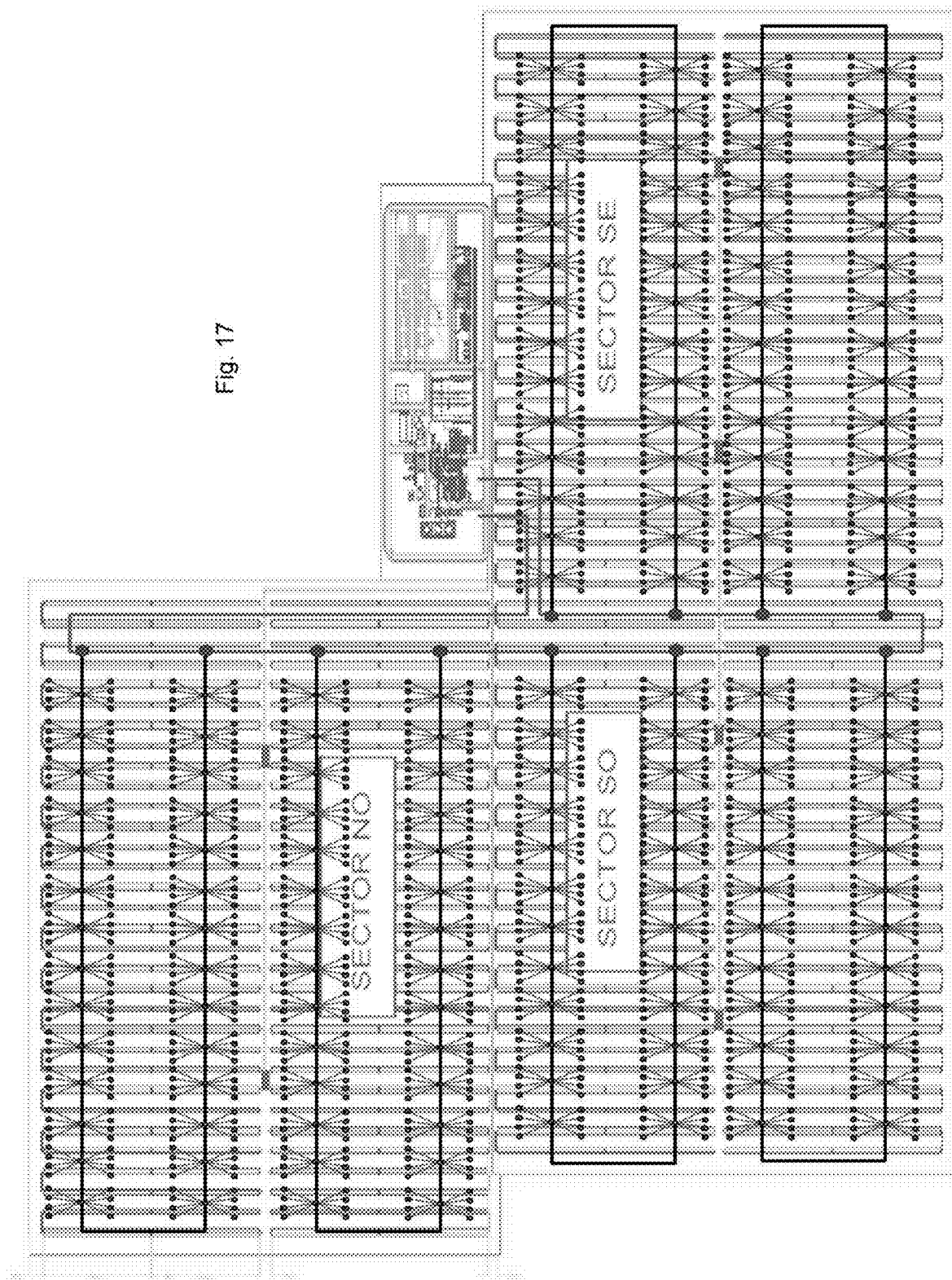
FIG. 17 shows a plant view of a solar plant according to an exemplary embodiment of the present disclosure.

FIG. 17 shows a plant view of a solar plant according to an exemplary embodiment of the present disclosure. FIG. 17 is a more detailed example of a plant view where a solar plant is shown with its solar field, divided into different sectors, and with the power generation part in the upper right corner. The sectors of the solar field are named and placed in the image according to their geographical location: north (NO), south (SO) and south-east (SE). Within the solar field, each PLC is graphically represented by a small black dot, and the network switches are represented by a larger black dot. The communication connections between the PLCs and network switches as well as with the power generation equipment are depicted as solid lines of varying color, depending on the type of communication bus.

Starting from this plant view, a user can zoom in and navigate to a more detailed view of a part of the solar plant, which in connection with the present disclosure is called a part-network of the communication network of the plant, where more detailed information, for example process values of selected devices in the solar field or in the power generation part, can become visible.

The way, in which the nodes of a network topology are represented graphically, e.g., in which the network devices are arranged with respect to each other on the screen, can be chosen by the user by selecting corresponding image handling parameters.

Figure 8:
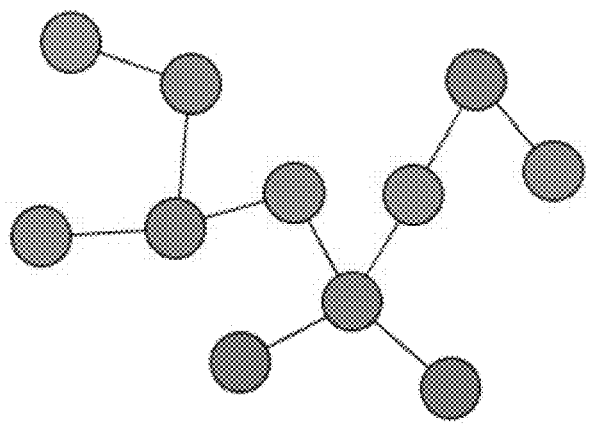
FIG. 8 shows the arrangement of image representations in an organic way according to an exemplary embodiment of the present disclosure.
Figure 10:
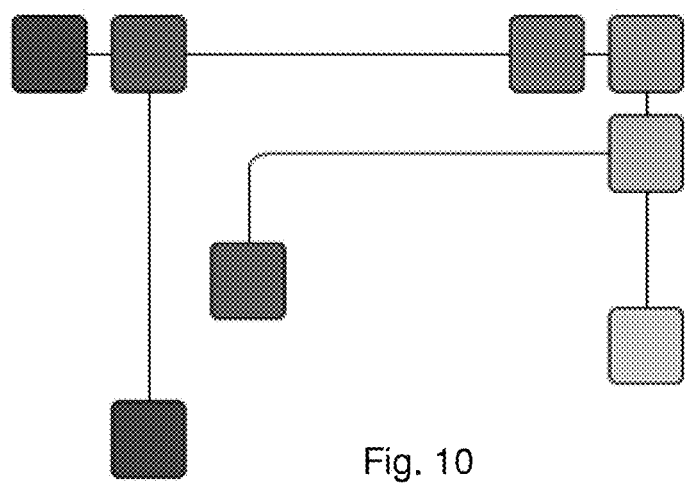
FIG. 10 shows the arrangement of image representations in an orthogonal way according to an exemplary embodiment of the present disclosure.
Figure 11:
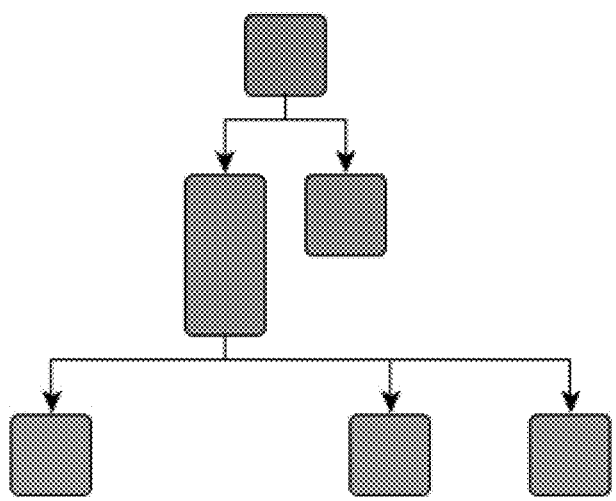
FIG. 11 shows the arrangement of image representations in a tree-like way according to an exemplary embodiment of the present disclosure.
Figure 12:
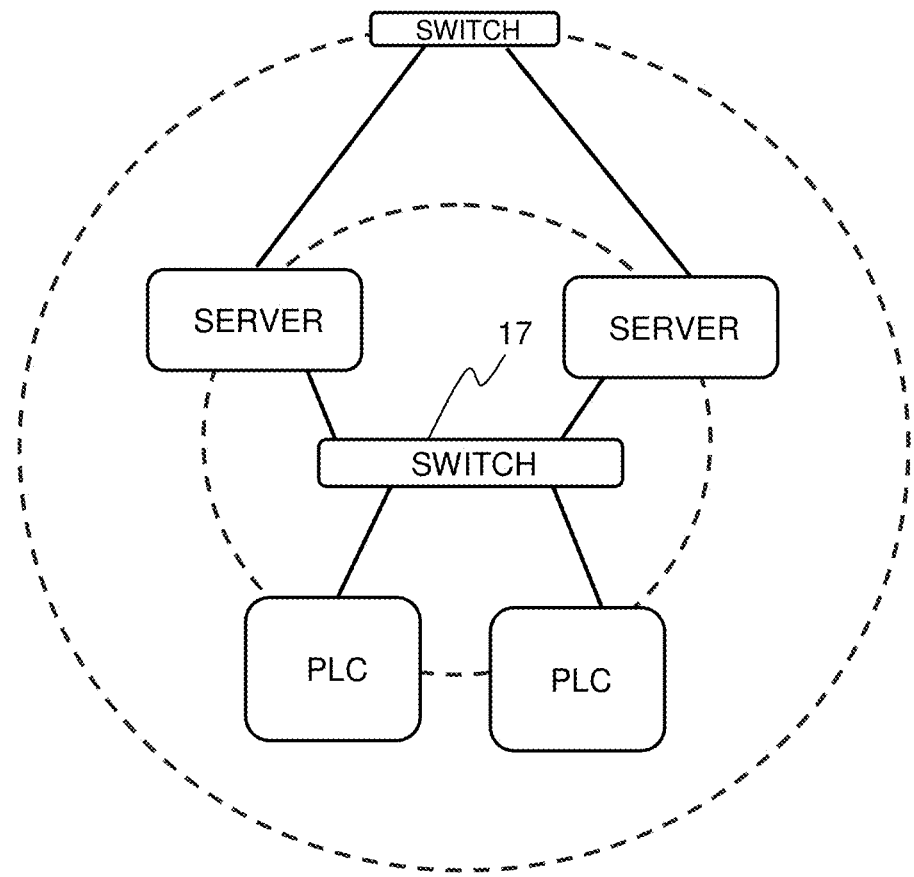
FIG. 12 shows a neighbor view of the network of FIG. 3 according to an exemplary embodiment of the present disclosure.

FIG. 8 shows the arrangement of image representations in an organic way according to an exemplary embodiment of the present disclosure; FIG. 9 shows the arrangement of image representations in a circular way according to an exemplary embodiment of the present disclosure; FIG. 10 shows the arrangement of image representations in an orthogonal way according to an exemplary embodiment of the present disclosure; and FIG. 11 shows the arrangement of image representations in a tree-like way according to an exemplary embodiment of the present disclosure;

When wanting to see details of the above described system topology view or plant view, a user can be presented with different possibilities for how to present the detail information. FIG. 12 shows a neighbor view of the network of FIG. 3 according to an exemplary embodiment of the present disclosure. As shown FIG. 12, the neighbor view of the network of FIGS. 3 to 7 includes a selected network device, here it is network switch 17, and its direct neighboring network devices and the corresponding communication connections are visualized at an increased zoom level and where the rest of the image representations of the communication network are shown at a reduced zoom level. The network devices of FIG. 12 are arranged in a circular way, where network switch 17 forms the central point of the circle. The direct neighbors, two servers and two PLCs, are arranged on a first, innermost circle closest to network switch 17. The further neighbors which are one further network device away, in this example only one other network switch, are arranged on a second circle surrounding the first circle and are shown at a reduced zoom level compared to the central network switch 17 and its direct neighbors. The zoom level of all other network devices is here set to zero.

Figure 14:
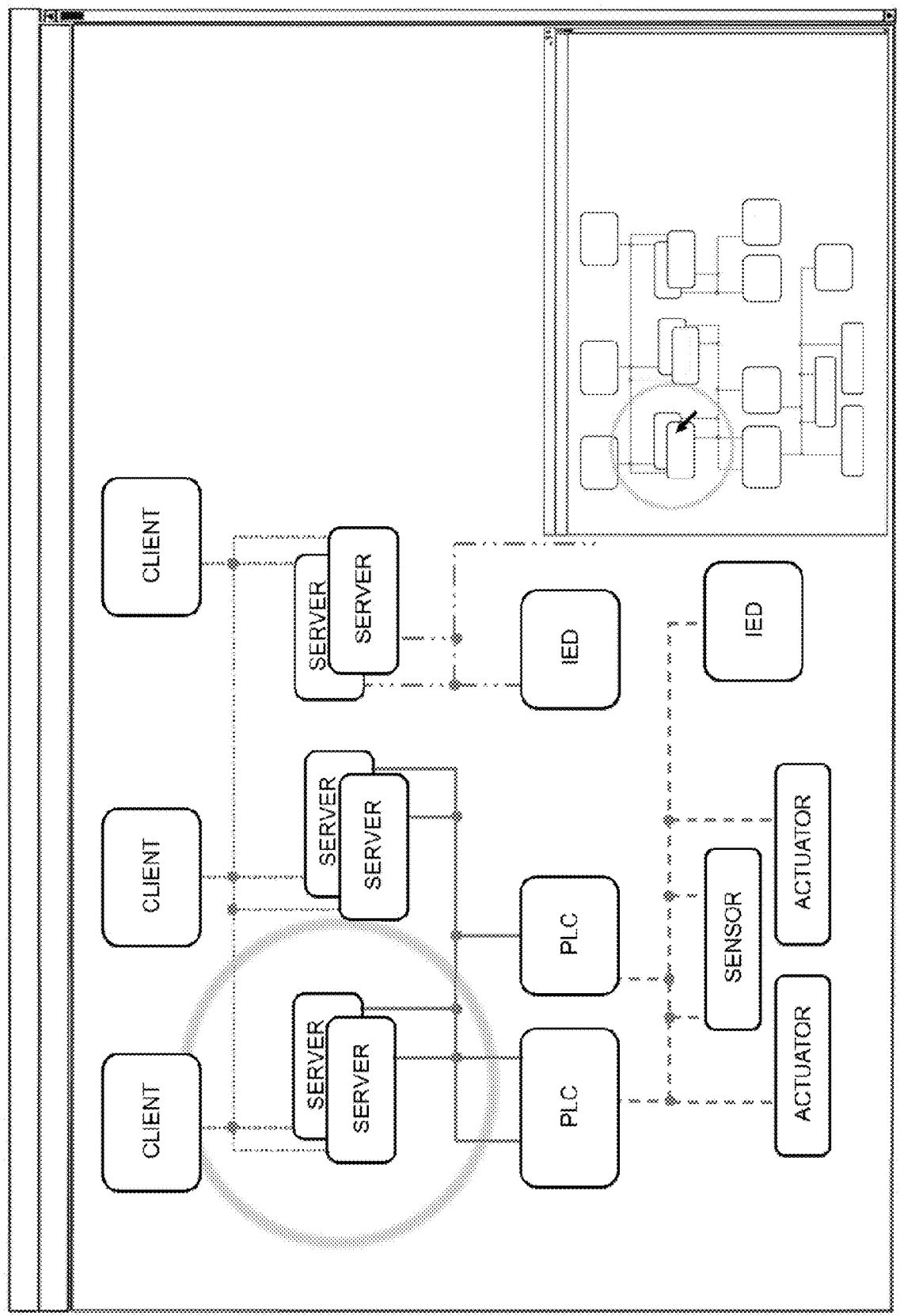
FIG. 14 shows a zoomed view of the network of FIG. 1 according to an exemplary embodiment of the present disclosure.

FIG. 14 shows a zoomed view of the network of FIG. 1 according to an exemplary embodiment of the present disclosure. As shown in FIG. 14 the zoomed view a selected part-network of the communication network is visible at an increased zoom level and where the rest of the image representations of the communication network are visible at a reduced zoom level including a marking for the selected part-network. In the example of FIG. 14, the whole network is depicted in a so called mini-map, e.g., not only the rest of the image representations are shown at the reduced zoom level but the zoomed-in part-network as well, so that an overview of the whole communication network is shown at a reduced zoom level inside a frame. The frame or mini-map can be seen to the lower right side of FIG. 14. Within the mini-map, the zoomed-in part-network is marked by a circle. A mouse pointer in the form of a small arrow is shown here as well, indicating that a user has selected the part-network by placing the circle inside the mini-map via user input device 4. The selected part-network is shown at an increased zoom level together with surrounding parts of the communication network. A similar way for visualizing a selected part-network at an increased zoom level together with the remaining communication network at a decreased zoom level is a virtual magnifying glass. The magnifying glass is movable on the screen of graphical display unit 5 via input device 4, and everything below it is seen at the increased zoom level.

Figure 15:
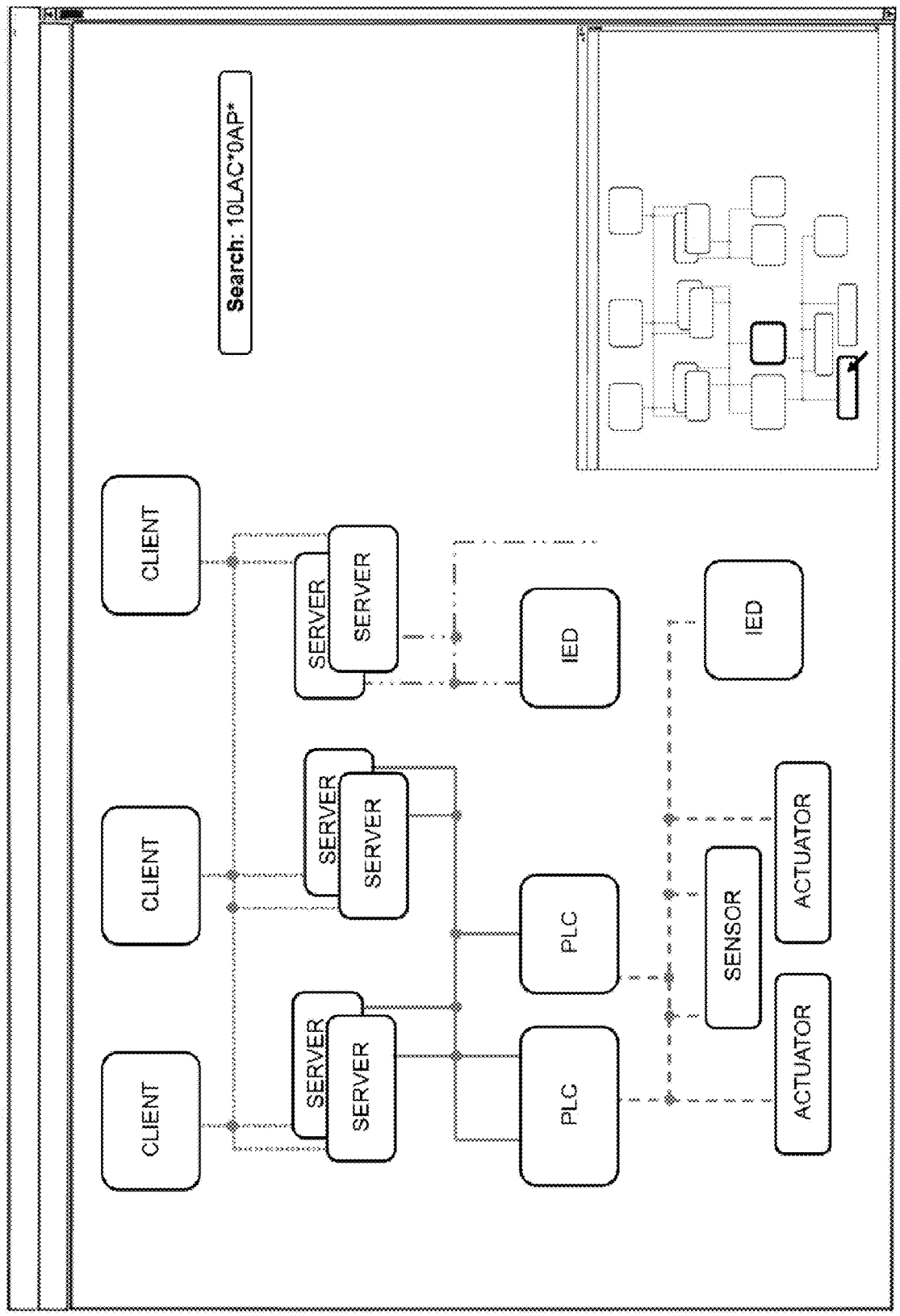
FIG. 15 shows the zoomed view of FIG. 14 with search functionality according to an exemplary embodiment of the present disclosure.

FIG. 15 shows the zoomed view of FIG. 14 with search functionality according to an exemplary embodiment of the present disclosure. Apart from using a mouse for selecting a specific part of the communication network to be displayed at the increased zoom-level, also a keyboard or head set can be used. For example, as is shown in FIG. 15, a search engine can be provided which interacts with data storing unit 6 to allow for searches after text strings which are attached to the image representations. Such text strings could for example be the names or types of network devices or of communication connections. In FIG. 15, the text string is entered into a search dialogue window. All the hits matching the text string are highlighted in the mini-map. Additionally, the remaining parts of the communication network could be shown in a collapsed way, if so requested by the user via image handling parameters.

Figure 16:
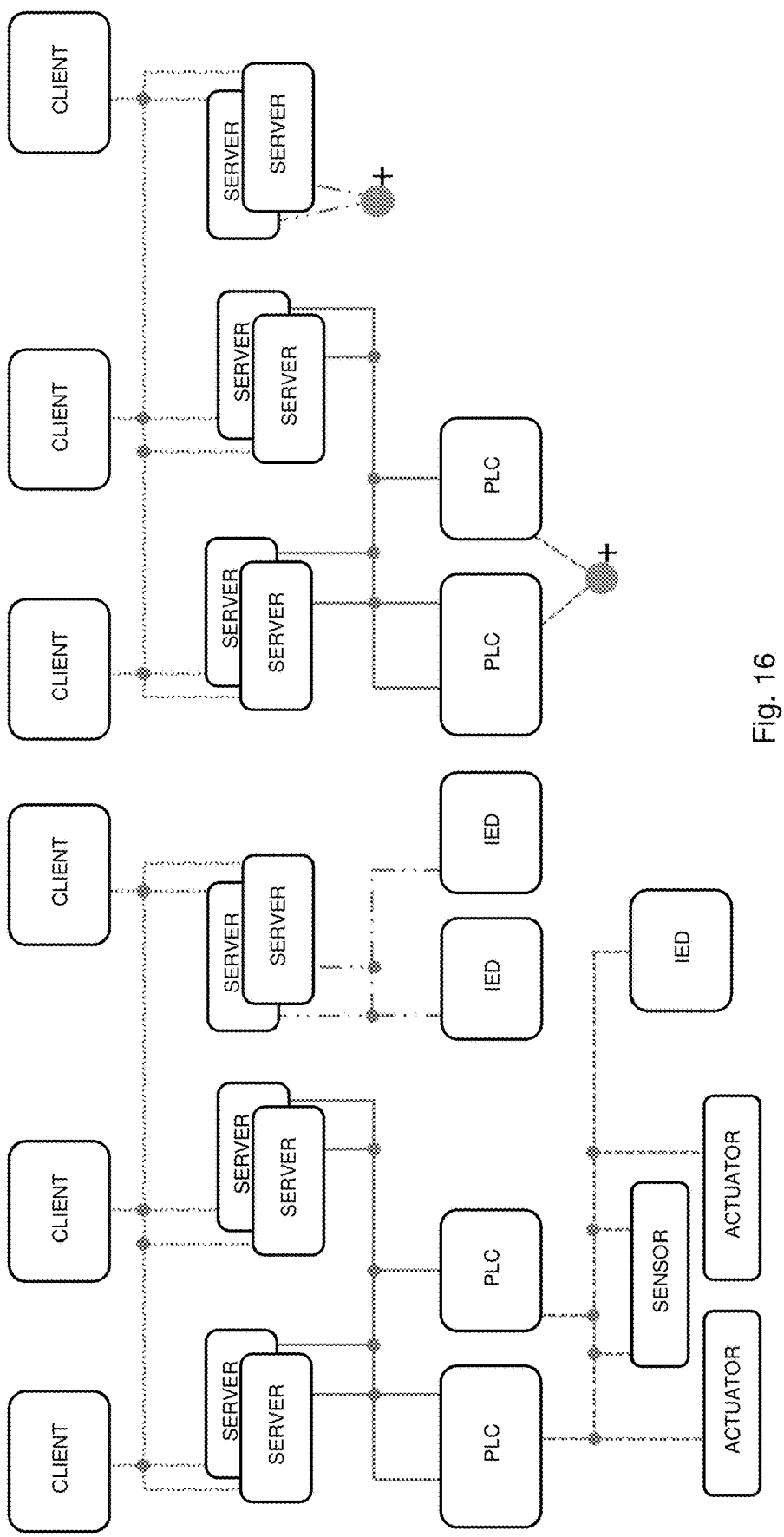
FIG. 16 shows a collapsed view of the network of FIG. 1 according to an exemplary embodiment of the present disclosure.

FIG. 16 shows a collapsed view of the network of FIG. 1 according to an exemplary embodiment of the present disclosure. On the left hand side, the communication network of FIG. 1 can be seen in its expanded view, and on the right hand side, two selected part-networks are visible in a collapsed form represented by a corresponding graphical symbol and attached to the image representations of the rest of the communication network. The graphical symbol is here is dot with a plus sign attached. The two selected and collapsed part-networks are those parts which belong to the lowermost ends of the hierarchy of the network: two actuators, one sensor and one IED on one side and two IEDs on the other side. Of course, the two collapsed part-networks can be expanded again, either at a specific request by the user or depending on the current type of view of the communication network.

Further examples for possible ways to show more details of a selected part-network are the so called detail view, where the communication network is shown at a varying zoom level with a selected level of constant information density. In other words, the further the user zooms into the communication network, the more additional information is made visible for each of the network devices and communication connections which remain on screen. This can for example be combined with a pan-and-zoom functionality. The desired level of constant information density can be selected by the user as an image handling parameter.

An even further example for a zoomed-in or detailed view of a selected part-network is the so called wrapped view, where the communication network is wrapped on a three-dimensional ovoid shape, resulting in the two-dimensional image representations located in the center of the visible part of the shape being shown at an increased zoom level compared to the image representations located closer to the boundary of the shape.

Figure 18:
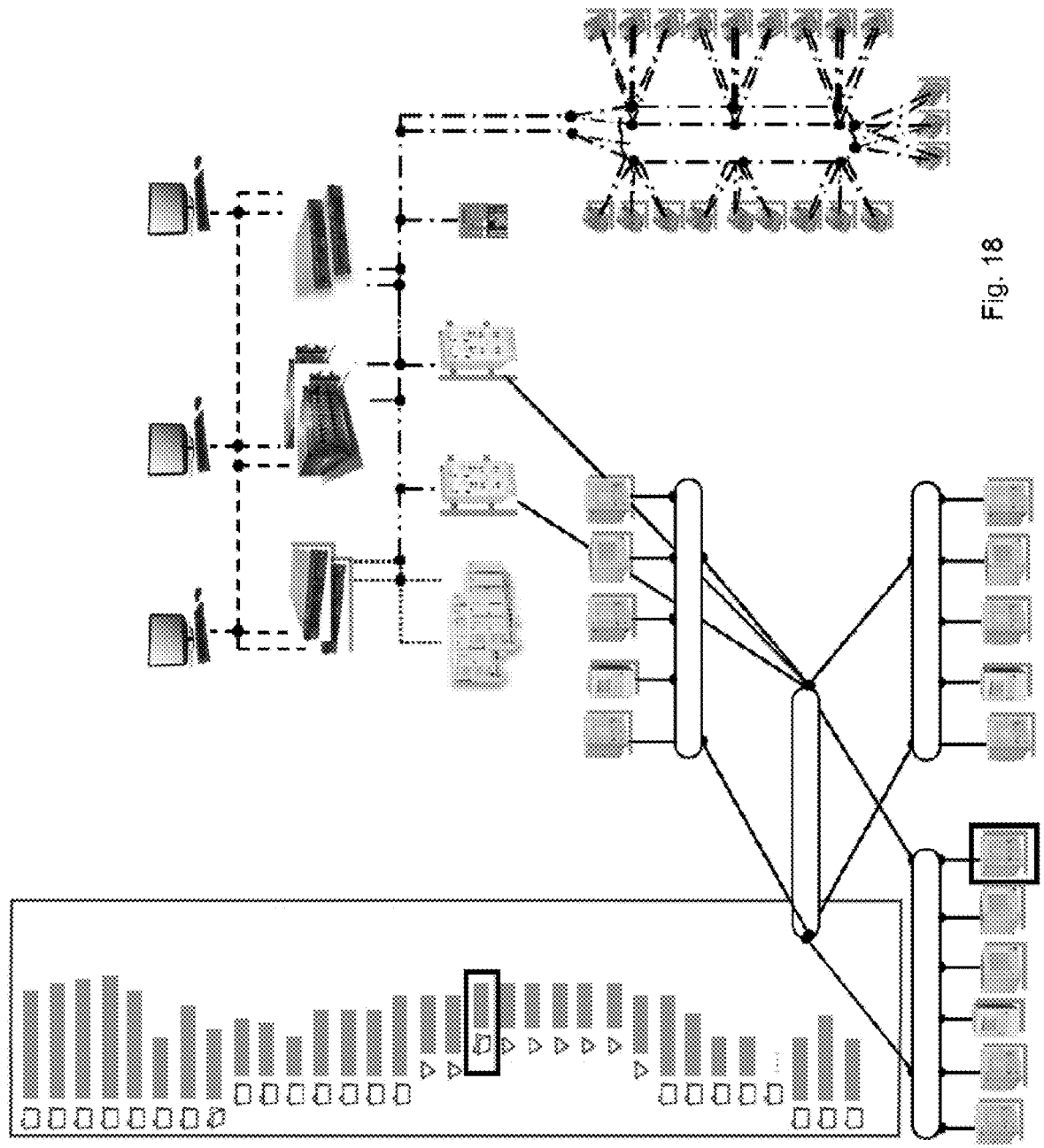
FIG. 18 shows a combined view of the communication network of a plant according to an exemplary embodiment of the present disclosure.

FIG. 18 shows a combined view of the communication network of a plant according to an exemplary embodiment of the present disclosure. Depending on the specific needs of the user, the above described various views of the communication network and the different ways to graphically arrange the network devices can be applied in a combined view to more than one of its part-networks. An example for such a combined view can be seen in FIG. 18, where a simplified view is applied to the upper part-network, a logical view with an organic arrangement of network devices is applied to the part-network shown to the lower left and a physical view with an organic arrangement of network devices is applied to the part-network to the lower right. In the example of FIG. 18, the data processing unit 3 is arranged to generate as part of the displayable information a hierarchical list of the network devices, in which list at least one of those network devices is graphically highlighted which at the same time is visible with an increased zoom level in the image representations. The hierarchical list is shown in FIG. 18 to the left of the graphics representation of the communication network. The highlighted network device is a controller, the image representation of which and the name of which are surrounded by a solid rectangle in the graphical view of the communication network and in the hierarchical list, respectively. It is suggested that the visual navigation through the communication network is possible both via the hierarchical list and the image representations, i.e. once an object is selected either in the graphics view or in the hierarchical list, it is automatically highlighted in both views.

In a further embodiment of the disclosure, the data processing unit 3 is arranged to generate at least one of the above described views for at least one of the part-networks or for the whole communication network showing the topology and configuration of the communication connections of the respective network according to a selected layer of the OSI model of computer networking. In other words, the data processing unit 3 is arranged to navigate through the OSI layers of the communication network provided by data storing unit 6 and to create a view where the specific information corresponding to a selected one of the OSI layers becomes visible.

For all the described views, it is common that the data processing unit 3 is arranged to generate as part of the displayable information displayable text which specifies at least one parameter of at least one of the network devices and/or communication connections. The displayable text can for example indicate the OSI layer which is currently displayed, or the type of a network communication protocol, the type of a network redundancy protocol, an IP address, a port configuration, a name of a device, or status information of a network device or of a communication connection. The status information could for example be an alarm or a particular process value of a network device. Further, the status information could relate to the status of data which are to be transferred between network devices or which are presented in different network devices. For example, such data could be data to be downloaded from an engineering server to a controller device, where both devices are connected to the communication network. For example, the status information could indicate the version of the data which were last downloaded or it could indicate their consistency of data in the controller device with respect to the corresponding data in the engineering server.

In order to provide the user with even more visual information, the data processing unit 3 can be arranged to generate at least one image representation of a communication connection in highlighted form compared to the image representations of the other communication connections, e.g., communication busses can for example be distinguished by their line color or line thickness.

As already mentioned above, a user can select and/or configure various image handling parameters in order to customize the visual representation of the communication network according to his specific needs. Therefore, the user interface is arranged for receiving image handling parameters which define at least one of the type of view for the network or the part-networks, respectively, the way of arranging the image representations, the selected network device, the selected part-network, the zooming level, the type of displayable text, and the level of constant information density.

In all the above described examples, only one communication network of the plant is visualized. However, in one and the same plant there can exist separate technical installations, for example two separate power generation units, and each of these technical installations is equipped with an independent communication network. Accordingly, in the tools for engineering and operations, data of two separate network topologies are handled. In such a case, the user interface 1, the graphical display unit 5, the data storing unit 6 and the data processing unit 3 are arranged to visualize at least two of the communication networks of the industrial plant. Due to the simultaneous visualization of the several communication networks of one and the same plant, the handling is simplified since switching between different projects and/or different graphical windows is avoided.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A system for displaying a communication network interconnecting technical equipment of an industrial plant, the system comprising:
    a user interface arranged for receiving image handling parameters:
    a data storing unit arranged for providing data relating to the technical equipment as device data and network data, the device data describing network devices which are all connected to the communication network and belong to the industrial plant, and the network data describing all the communication connections between the network devices;
    a data processing unit arranged for (i) retrieving the provided data from the data storing unit, (ii) transforming the device data and the network data into displayable information which contains image representations of all of the network devices and of all of the communication connections, wherein the displayable information comprises at least one of displayable text and a displayable icon specifying a consistency of data which are to be transferred between at least two network devices or which are present in at least two network devices, (iii) generating a plant view of the communication network containing the image representations and illustrating geographical locations of the network devices inside the plant and physical connection lines, and (iv) generating a zoomed view of a selected part of the plant view of the communication network with search functionality by (a) providing a search engine which interacts with the data storing unit to allow for searches of text strings associated with the image representations and (b) highlighting, in response to receiving a text string to be searched, all image representations that match the text string; and
    a graphical display unit arranged to display the image representations and further displayable information according to the image handling parameters.

2. The system according to claim 1, wherein:
    the user interface is arranged for receiving plant related input data, the data storing unit is arranged for updating the device data and network data in accordance with the plant related input data or in accordance with update information received from an external data source,
    the data processing unit is arranged to automatically update the image representations as soon as the device data and network data are updated, and
    the graphical display unit is arranged to automatically update the display of the image representations and further displayable information as soon as the image representations are updated.

3. The system according to claim 1, wherein the data storing unit is arranged to provide the device data and network data according to a respectively assigned part-network, where in a respective part-network is defined by at least one of a physical layer, a network communication protocol, and a graphically selected boundary which is received by the user interface as corresponding boundary parameters, and wherein the data processing unit is arranged to generate the image representations with or without a graphical representation of the assignment to the respective part-network, depending on the image handling parameters.

4. The system according to claim 2, wherein the data storing unit is arranged to provide the device data and network data according to a respectively assigned part-network, where in a respective part-network is defined by at least one of a physical layer, a network communication protocol, and a graphically selected boundary which is received by the user interface as corresponding boundary parameters, and wherein the data processing unit is arranged to generate the image representations with or without a graphical representation of the assignment to the respective part-network, depending on the image handling parameters.

5. The system according to claim 3, wherein at least one of a first part-network can include as network devices plant controller devices of a distributed control system, a second part-network can include as network devices automation devices of a power supply system, a third part-network can include as network devices at least one of operation servers, operation clients for monitoring plant controller devices, and automation devices.

6. The system according to claim 1, wherein the data processing unit is arranged to generate at least one of a location view, a physical view, a logical view, a simplified view and a plant view, wherein the respective view contains the image representations in such a way that one of the following becomes visible:
    a respective geographical location of the network devices inside the plant, physical connection lines between the network devices, implemented logical connections between the network devices, or available communication paths between the network devices, respectively.

7. The system according to claim 1, wherein the data processing unit is arranged to generate at least one of a zoomed view, a neighbor view, a detail view, a collapsed view and a wrapped view, wherein a respective view contains the image representations in such a way that one of the following becomes visible:
    a selected part-network at an increased zoom level together with a remainder of the image representations of the communication network at a reduced zoom level including a marking for the selected part-network,
    a selected network device and direct neighboring network devices of the selected network device and the corresponding communication connections at an increased zoom level and a remainder of the image representations of the communication network at a reduced zoom level,
    the communication network at a varying zoom level with a selected level of constant information density,
    at least one selected part-network in collapsed form represented by a corresponding graphical symbol and attached to the image representations of the rest of the communication network, or
    the communication network wrapped on a three-dimensional ovoid shape, resulting in the two-dimensional image representations located in a center of a visible part of the shape being shown at an increased zoom level compared to the image representations located closer to the boundary of the shape, respectively.

8. The system according to claim 5, wherein the data processing unit is arranged to generate one of at least two different views for each of at least two of the part-networks.

9. The system according to claim 5, wherein the data processing unit is arranged to generate at least one of the views for at least one of the part-networks or for the whole communication network showing the topology and configuration of the communication connections of the respective network according to a selected layer of the OSI model of computer networking.

10. The system according to claim 5, wherein the data processing unit is arranged to generate at least one of the views in such a way that the image representations of the network devices and communication connections are arranged in an orthogonal, organic, tree-like or circular way.

11. The system according to claim 5, wherein the user interface is arranged for receiving image handling parameters which define at least one of:
   the type of view for the network or the part-networks, respectively,
   the way of arranging the image representations,
   the selected network device,
   the selected part-network,
   the zooming level,
   the type of displayable text, and
   the level of constant information density.

12. The system according to claim 5, where the data processing unit is arranged to generate as part of the displayable information a hierarchical list of the network devices, in which list at least one of those network devices is graphically highlighted which at the same time is visible with an increased zoom level in the image representations.

13. The system according to claim 11, wherein the user interface, the data processing unit and the graphical display unit are arranged to allow for a visual navigation through the communication network both via a hierarchical list and the image representations.

14. The system according to claim 1, wherein the data processing unit is arranged to generate at least one image representation of a communication connection in highlighted form compared to the image representations of the other communication connections.

15. The system according to claim 1, wherein the user interface, the graphical display unit, the data storing unit and the data processing unit are arranged to display at least two of the communication networks of the industrial plant.

16. The system according to claim 1, wherein the data storing unit is arranged to exchange data with at least two computer-implemented engineering and/or operations tools.

17. A method for displaying technical equipment of an industrial plant, the method comprising:
   receiving image handling parameters;
   providing data relating to the technical equipment in the form of device data and network data describing a communication network of the industrial plant, wherein the device data describes network devices which are all connected to the communication network and belong to the industrial plant, and the network data describe all the communication connections between the network devices;
   transforming all the device data and all the network data into displayable information which contains image representations of all of the network devices and of all of the communication connections, wherein the displayable information comprises at least one of displayable text and a displayable icon specifying a consistency of data which are to be transferred between at least two network devices or which are present in at least two network devices;
   generating a plant view of the communication network containing the image representations in such a way that geographical locations of the network devices inside the plant and physical connection lines become visible, wherein a selected part of the plant view of the communication network is displayable at a varying zoom level;
   displaying the image representations and further displayable information according to the image handling parameters;
   generating a zoomed view of a selected part of the plant view of the communication network with search functionality by providing a search engine which interacts with the data storing unit to allow for searches of text strings which are attached to the image representations; and
   highlighting, in response to receiving a text string to be searched, all the image representations that match the text string.

18. The system of claim 1, wherein the data processing unit is further arranged to generate a plant view such that at least one of (i) implemented logical connections and (ii) available communication paths between the network devices becomes visible.

* * * * *